United States Patent
Vollstedt et al.

(10) Patent No.: US 12,250,130 B2
(45) Date of Patent: Mar. 11, 2025

(54) CONFIGURATION MANAGEMENT FOR AVIONICS NETWORK, AND METHOD FOR CHECKING THE CONFIGURATION OF AN AVIONICS NETWORK

(71) Applicant: Airbus Operations GmbH, Hamburg (DE)

(72) Inventors: Thomas Vollstedt, Hamburg (DE); Ralf Schliwa, Hamburg (DE); Stéphane Poulain, Hamburg (DE); Daniel Alexander Kliem, Hamburg (DE); Guillermo Carmona-Puga, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/609,897

(22) PCT Filed: Nov. 24, 2020

(86) PCT No.: PCT/EP2020/083262
§ 371 (c)(1),
(2) Date: Nov. 9, 2021

(87) PCT Pub. No.: WO2021/105151
PCT Pub. Date: Jun. 3, 2021

(65) Prior Publication Data
US 2022/0311683 A1 Sep. 29, 2022

(30) Foreign Application Priority Data
Nov. 29, 2019 (DE) ...................... 10 2019 218 574.6

(51) Int. Cl.
*H04L 43/028* (2022.01)
*B64F 5/00* (2017.01)
(Continued)

(52) U.S. Cl.
CPC .............. *H04L 43/028* (2013.01); *B64F 5/00* (2013.01); *H04L 12/40006* (2013.01);
(Continued)

(58) Field of Classification Search
CPC .............. H04L 43/028; H04L 12/40006; H04L 41/0869; H04L 67/12; H04L 2012/4028; B64F 5/00
See application file for complete search history.

(56) References Cited

U.S. PATENT DOCUMENTS 8,589,020 B1 11/2013 Angus et al.
8,683,266 B2 3/2014 Migliasso et al.
(Continued)

FOREIGN PATENT DOCUMENTS

| EP | 1426870 A2 | 6/2004 |
|---|---|---|
| WO | 2007059322 A2 | 5/2007 |
| WO | 2017025249 A1 | 2/2017 |

OTHER PUBLICATIONS

International Search Report and Written Opinion; priority document.

*Primary Examiner* — Joseph L Greene
(74) *Attorney, Agent, or Firm* — Greer, Burns & Crain, Ltd.

(57) ABSTRACT

An avionics network including a plurality of avionics components and a configuration monitoring device, which is connected by wire or wirelessly to the plurality of avionics components. The configuration monitoring device has at least one configuration data interface configured to receive a plurality of configuration parameters characterizing the operating status of the avionics components. The configuration monitoring device further includes a parameter filtering device connected to the configuration data interface and configured to filter a subset of the configuration parameters received. The configuration monitoring device additionally (Continued)

includes reference parameter storage, configured to store sets of reference values for configuration parameters, and a parameter comparison device, coupled to the reference parameter storage and the parameter filtering device, and configured to compare the subset of configuration parameters received and filtered by the parameter filtering device with a set of reference values for the configuration parameters stored in the reference parameter storage.

17 Claims, 1 Drawing Sheet

(51) Int. Cl.
    *H04L 12/40*     (2006.01)
    *H04L 41/0869*     (2022.01)
    *H04L 67/12*     (2022.01)

(52) U.S. Cl.
    CPC .......... *H04L 41/0869* (2013.01); *H04L 67/12* (2013.01); *H04L 2012/4028* (2013.01)

(56) References Cited

U.S. PATENT DOCUMENTS

| | | | |
|---|---|---|---|
| 8,793,026 B2 | 7/2014 | Boy et al. | |
| 9,384,601 B2 | 7/2016 | Duarte et al. | |
| 9,824,595 B1 * | 11/2017 | Pate | G07C 5/0808 |
| 10,078,955 B1 | 9/2018 | Gang et al. | |
| 10,235,523 B1 * | 3/2019 | Keller, III | G06F 13/4282 |
| 2003/0200026 A1 * | 10/2003 | Pearson | G06F 8/65 340/961 |
| 2004/0106404 A1 | 6/2004 | Gould et al. | |
| 2005/0248444 A1 * | 11/2005 | Joao | B60R 25/104 340/539.11 |
| 2007/0124222 A1 | 5/2007 | Avery et al. | |
| 2008/0177428 A1 * | 7/2008 | Fok | G08G 5/0082 701/3 |
| 2009/0167190 A1 * | 7/2009 | Hickey | H05B 45/40 315/129 |
| 2010/0036545 A1 * | 2/2010 | Fok | G08G 5/0043 701/2 |
| 2013/0036103 A1 | 2/2013 | Lawson et al. | |
| 2014/0337616 A1 | 11/2014 | Kimberly | |
| 2015/0180977 A1 * | 6/2015 | Riedel | G06F 9/451 715/736 |
| 2016/0117868 A1 * | 4/2016 | Mitchell | H04L 63/0428 701/32.3 |
| 2016/0154391 A1 * | 6/2016 | Pavaskar | H04L 41/0803 701/3 |
| 2017/0043884 A1 | 2/2017 | Bedin et al. | |
| 2019/0325664 A1 | 10/2019 | Oronte et al. | |
| 2020/0119806 A1 * | 4/2020 | Carro | G07C 5/085 |
| 2020/0165995 A1 * | 5/2020 | Moeckly | F02D 41/22 |

\* cited by examiner

CONFIGURATION MANAGEMENT FOR AVIONICS NETWORK, AND METHOD FOR CHECKING THE CONFIGURATION OF AN AVIONICS NETWORK

CROSS-REFERENCES TO RELATED APPLICATIONS

This application claims the benefit of the International Application No. PCT/EP2020/083262, filed on Nov. 24, 2020, and of the German patent application No. 102019218574.6 filed on Nov. 29, 2019, the entire disclosures of which are incorporated herein by way of reference.

FIELD OF THE INVENTION

The invention relates to an avionics network, i.e., to a data network for use in avionics applications, having integrated configuration management, and to a method for checking the configuration of an avionics network.

BACKGROUND OF THE INVENTION

A large number of different electronic components of different levels of integration are typically used in technically complex mobile transportation platforms such as automobiles, trains, ships or aircraft. Examples of such electronic components are control systems, sensor systems, computer systems, network nodes or other technical apparatuses needed to operate the transportation platform.

No less complex are the checking schemes needed to allow adequate monitoring and documenting of changes in the configuration of the component networks and their network environment, and which can be used to distinguish between authorized and potentially unauthorized configuration modifications reliably and promptly.

Document US 2019/0325664 A1 discloses computer-implemented methods for characterizing configurations of transportation platforms. Document U.S. Pat. No. 9,384,601 B2 discloses a method for checking the performance of an aircraft component. Document U.S. Pat. No. 8,793,026 B2 discloses life-cycle management for electrical loads in an aircraft. Document US 2013/0036103 A1 discloses a system for validating software components in an aircraft. Document U.S. Pat. No. 8,683,266 B2 discloses systems and methods for configuration validation of complex multi-agent systems on board aircraft.

SUMMARY OF THE INVENTION

One of the objects of the invention is to find improved solutions for reliable, safe and simple checking of configurations of avionics networks.

According to a first aspect of the invention, an avionics network comprises a multiplicity of avionics components and a configuration monitoring device connected to the multiplicity of avionics components in a wired or wireless manner. The configuration monitoring device has at least one configuration data interface, which is designed to receive a multiplicity of configuration parameters that characterize the operating status of the avionics components. In addition, the configuration monitoring device has a parameter filter device, which is connected to the at least one configuration data interface, and is designed to filter a subset of the received configuration parameters. The configuration monitoring device also has a reference-parameter memory, which is designed to store sets of reference values for configuration parameters, and a parameter comparison device, which is coupled to the reference-parameter memory and the parameter filter device, and is deigned to compare the subset of the received configuration parameters, which has been filtered by the parameter filter device, with a set of reference values for the configuration parameters, which is stored in the reference-parameter memory.

According to a second aspect of the invention, an aircraft comprises an avionics network according to the first aspect of the invention.

According to a third aspect of the invention, a method for checking the configuration of an avionics network comprises the steps of determining a multiplicity of configuration parameters that characterize an operating status of a multiplicity of avionics components, of transferring the multiplicity of configuration parameters to a configuration data interface of a configuration monitoring device, of filtering a subset of the received configuration parameters in a parameter filter device of the configuration monitoring device, and of comparing, by means of a parameter comparison device of the configuration monitoring device, the subset of the received configuration parameters, which has been filtered by the parameter filter device, with a set of reference values for the configuration parameters, which is stored in a reference-parameter memory of the configuration monitoring device.

A particular advantage of the solutions according to the invention is that, in a cabin management system having avionics components incorporated in a wired or wireless network group as network users, is it possible to determine dynamically and promptly the actual configuration of the individual components and the resultant configuration of the entire network. The cabin management system is able to collect measured or preset configuration parameters for all the components, and combine the configuration parameters into one or more fingerprints of the current configuration status, which are unique to the respective composition of the avionics network at that time.

Given that in avionics networks having a large number of components, the number of parameters to be determined and included in the check is inordinately high.

Advantageous embodiments and developments arise from the further subclaims and from the description with reference to the figures.

According to some embodiments of the avionics network, the avionics network can also have a filter control device, which is coupled to the parameter filter device and is designed to change dynamically selection settings for the parameter filter device for selecting the filtered subset of the received configuration parameters.

According to some further embodiments of the avionics network, the filter control device can also be coupled to the parameter comparison device and be designed to change the selection settings for the parameter filter device depending on a selection control signal from the parameter comparison device.

According to some further embodiments of the avionics network, the parameter filter device can have at least two sequentially arranged parameter filter stages, so that a first of the at least two sequentially arranged parameter filter stages pre-filters the received configuration parameters, and a second of the at least two sequentially arranged parameter filter stages post-filters the pre-filtered received configuration parameters for output of the filtered subset of the received configuration parameters.

According to some further embodiments of the avionics network, the filter control device can be coupled to each of the at least two sequentially arranged parameter filter stages and be designed to change dynamically and independently of one another, selection settings for the at least two sequentially arranged parameter filter stages for pre-filtering and post-filtering.

According to some further embodiments of the avionics network, one or more of the multiplicity of avionics components can have a wireless communication module, which is designed to transfer configuration parameters wirelessly to a wireless configuration data interface of the configuration monitoring device.

According to some further embodiments of the avionics network, the received configuration parameters can comprise identification numbers of the avionics components, safety certificates of the avionics components, power consumption profiles of the avionics components, network traffic profiles of the avionics components, attenuation values of the cabling of the avionics components, and/or position in which the avionics components are installed in an aircraft.

According to some further embodiments of the avionics network, the avionics components can comprise cabin management apparatuses, aircraft cabin monuments, aircraft cabin lighting elements, aircraft-seat electronic apparatuses, cabin displays, galley appliances, cabin audio equipment, and/or passenger service units.

According to some embodiments of the method, the method can also comprise the step of changing, by means of a filter control device of the configuration monitoring device, the selection settings for the parameter filter device for selecting the filtered subset of the received configuration parameters.

According to some further embodiments of the method, the changing of the selection settings for the parameter filter device can be performed depending on a selection control signal from the parameter comparison device.

According to some further embodiments of the method, the parameter filter device can have at least two sequentially arranged parameter filter stages, so that the filtering of the subset of the received configuration parameters comprises pre-filtering of the received configuration parameters in a first of the at least two sequentially arranged parameter filter stages, and post-filtering of the pre-filtered received configuration parameters in a second of the at least two sequentially arranged parameter filter stages for output of the filtered subset of the received configuration parameters.

The above embodiments and developments can be combined with one another in any practical way. Further possible embodiments, developments and implementations of the invention also include combinations of features of the invention that are described above or below with regard to the exemplary embodiments, even if these combinations are not mentioned explicitly. In particular here, a person skilled in the art will also add individual aspects as improvements or additions to the relevant basic form of the present invention.

BRIEF DESCRIPTION OF THE DRAWINGS

The present invention is described in greater detail below with reference to the exemplary embodiments presented in the schematic figures, in which.

Figure 1:
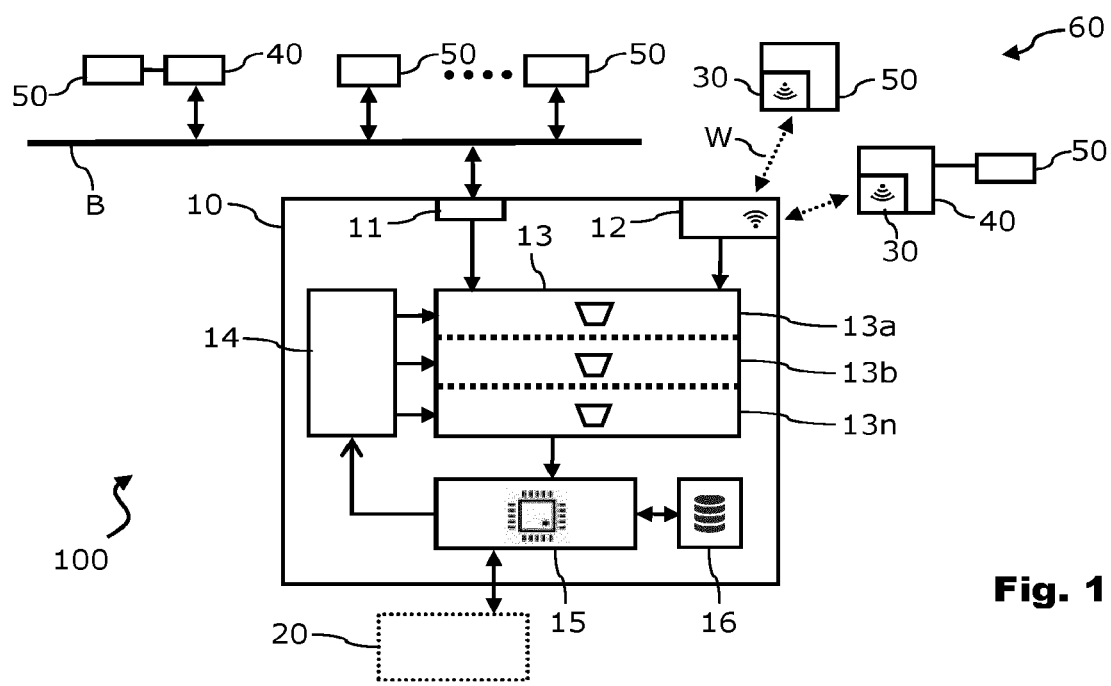
FIG. 1 is a schematic block diagram of an avionics network having integrated configuration management according to an exemplary embodiment of the invention.

The accompanying figures are intended to provide greater understanding of the embodiments of the invention. They illustrate embodiments and are used in conjunction with the description to explain principles and concepts of the invention. Other embodiments and many of the stated advantages are apparent from the drawings. The elements of the drawings are not necessarily shown to scale. Direction-defining terminology such as "above", "below", "left", "right", "over", "under", "horizontal", "vertical", "front", "back" and similar details are employed solely for explanatory purposes and are used without loss of generality in referring to specific embodiments as shown in the figures.

In the figures of the drawing, the same reference signs are used in each case to denote identical, functionally identical and equivalent elements, features and components, unless stated otherwise.

DETAILED DESCRIPTION OF THE PREFERRED EMBODIMENTS

The following description refers to avionics networks. Within the meaning of the present description, "avionics networks" include any type of network in which networked electronic components, in particular electrical and electronic apparatuses on board an aircraft, including electronic flight instruments, can transfer between one another data relevant to avionics applications by means of a shared data transfer protocol. The networked electronic components may comprise, for example, flight management systems, flight control systems, flight monitoring apparatuses, collision warning systems, intercommunication systems, aeronautical radio communication systems, navigation systems, instrument landing systems, global satellite navigation systems, inertial navigation systems, sensor system, radar system and any type of cabin and cargo modules, for instance galley components, stowage components, smart lighting and indicating devices, seat controls, sanitation-area controllers, in-flight entertainment systems, cabin management apparatuses, aircraft cabin monuments, aircraft cabin lighting elements, aircraft-seat electronic apparatuses, cabin displays, galley appliances, cabin audio equipment, and/or passenger service units, and the like.

Within the meaning of the present description, configuration parameters include any type of characterization features that can be measured or preset and are fundamentally suitable for making, by means of the data content thereof, a specific avionics component or a specific type of avionics component distinguishable from other avionics components or other types of avionics components. Within the meaning of the present description, configuration parameters can include in particular identification numbers, safety certificates, MAC addresses, IP addresses, serial numbers, version notations, approval data, power consumption profiles, network traffic profiles, total operating periods, or attenuation values of the cabling of the avionics components. It may also be possible to attribute to the avionics components extrinsic features such as the position of installation in an aircraft or interconnection with other components in an aircraft.

Some of the configuration parameters allow discretization of their parameter content and can therefore be designated as "precise" parameters. Other configuration parameters, on the other hand, have continuous spectra of parameter content, and can be designated only as "fuzzy" parameters. In principle, precise parameters are better suited to making one avionics component distinguishable from other similar avionics components, whereas fuzzy parameters, by virtue of the large amount of potential parameter content, can have greater discriminatory power than precise parameters for the variation over time of the state of an individual avionics component.

Figure 2:
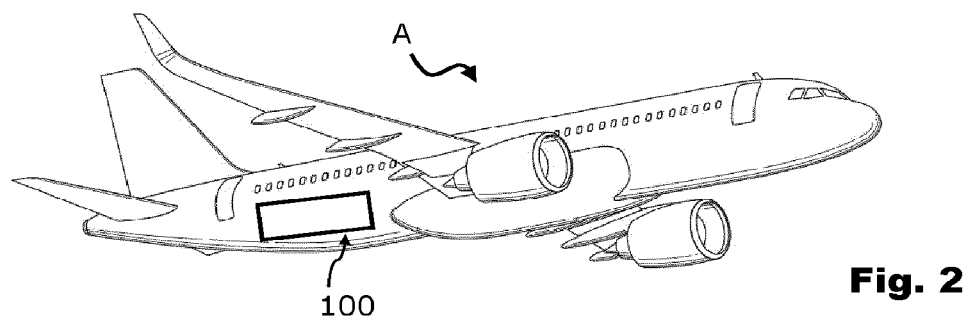
FIG. 2 is an illustration of an aircraft having an avionics network as shown in FIG. 1 according to an exemplary embodiment of the invention.

FIG. 1 shows, by way of example, a schematic illustration of an avionics network 100 in block diagram form. For example, the avionics network 100 can be used in an aircraft such as an aircraft A shown by way of example in FIG. 2. The avionics network 100 can be coupled via a gateway (not shown explicitly) on board the aircraft A to other networks in the aircraft A.

The avionics network 100 has a number of avionics components 50 as network users. The avionics network 100 has one or more databus systems, of which, one databus system B is shown explicitly in FIG. 1 by way of example. It should be obvious that more or fewer than two databus systems can also be used in the avionics network 100. The databus systems B may be—as shown—wired systems, for instance AFDX, ARINC 429, ARINC 629, ARINC 717, CAN bus, MIL-STD-1553 or TTP. Alternatively or additionally, it can also be possible to couple together one or more of the avionics components 50 wirelessly, for instance by means of ZigBee, WLAN, WiFi, WiMax or in another wireless network. For this purpose, the avionics components 50 can have wireless communication modules 30, which can be used to establish a wireless communication link W.

The avionics components 50 each have one or more network interfaces, via which they are coupled between one another and/or to the databus system B. The avionics components 50 may be any type of electrical or electronic units to be controlled on board an aircraft, for instance light modules, lights, indicator devices, galley modules, seat controls, cabin management apparatuses, aircraft cabin monuments, aircraft cabin lighting elements, aircraft-seat electronic apparatuses, cabin displays, galley appliances, cabin audio equipment, passenger service units, or the like. In some cases, it can be provided that external measurement systems 40 are available for one or more of the avionics components 50 in order to determine configuration parameters by external detection for the respective avionics components 50. In this case, the external measurement systems 40 can be coupled to the databus or alternatively have a wireless communication module 30.

The avionics components 50 can have a processor, for example, the configuration of which can be specified by a central configuration server of the avionics network according to the desired functionality. In addition, the avionics components 50 can optionally have input/output apparatuses and display devices for operation by a user. The configuration of the processor of the avionics components 50 can be stored in a configuration memory of the associated avionics component 50, which memory is operatively connected to the processor. The services for the processor are implemented in software, which can be invoked and executed in accordance with a software development kit (SDK) having a shared metadata standard (dictionary).

The variability of the avionics components 50 in terms of their adjustable functionality means that the avionics components 50 can assume a large number of possible operating statuses or configuration statuses. Catalyzed by a large number of avionics components 50, an avionics network 100 may therefore have a vast number of network statuses in total.

The avionics network 100 has a central configuration monitoring device 10, which is designed to check and monitor the avionics components 50 in terms of their configuration. For this purpose, the configuration monitoring device 10 can have at least one configuration data interface, which is designed to receive via a wired or wireless data communication channel a multiplicity of configuration parameters that characterize the operating status of the avionics components 50. The configuration parameters may be, for example, identification numbers of the avionics components 50, safety certificates of the avionics components 50, power consumption profiles of the avionics components 50, network traffic profiles of the avionics components 50, attenuation values of the cabling of the avionics components 50, and/or position in which the avionics components 50 are installed in an aircraft A. In principle, the configuration parameters can be classified as parameters having parameter content that is constant and unique to the avionics component 50, and as parameters having variable, time-varying and status-dependent parameter content.

The configuration data interface may be, for example, a wired databus interface 11, which is coupled to one or more databuses of the avionics network 100. Alternatively, the configuration data interface may comprise a wireless communication module 12, which is designed to maintain wireless data communication with various wireless communication modules 30 in the environment.

The configuration monitoring device 10 has a reference-parameter memory 16 for the purpose of comparing an actual overall configuration of the avionics components 50 of an avionics network 100. The reference-parameter memory 16 may be, for example, a flash memory, a memory card, a hard disk, an EEPROM, or another type of hardware memory in which data can be stored temporarily or permanently and in a readable manner One or more sets of reference values for configuration parameters can be stored in this reference-parameter memory 16. These sets of reference values can be defined from outside, for example, or current configurations can be determined, and their configuration parameters released as reference values.

The reference-parameter memory 16 is coupled to a parameter comparison device 15. The parameter comparison device 15 receives the configuration parameters obtained from the avionics components 50 in order to compare these configuration parameters with one of the sets of reference values for the configuration parameters, which sets are stored in the reference-parameter memory 16. Depending on the result of this comparison, the parameter comparison device 15 can output a comparison signal, which can be output, for example, to a user via an external operating or indicator apparatus 20.

To avoid the parameter comparison device 15 having to take into account for the comparison all configuration parameters that have been determined or are determinable, a parameter filter device 13 can be coupled between the configuration data interface(s) 11 and 12 and the parameter comparison device 15. The parameter filter device 13 can be used to filter out a subset of the received configuration parameters from the total set of all the determined configuration parameters, so that the parameter filter device 13 transfers to the parameter comparison device 15 only a filtered subset of the received configuration parameters. This filtered subset is then compared in the parameter comparison device with a set of reference values for the configuration parameters that is stored in the reference-parameter memory 16.

In order to be able to adjust dynamically the selection of those configuration parameters intended for inclusion in the filtered subset, the configuration monitoring device 10 can have a filter control device 14, which is coupled to the parameter filter device 13. By means of an external user input or by means of a selection control signal fed back from the parameter comparison device 15, for example, the filter control device 14 can dynamically change selection settings for the parameter filter device 13 for selecting the filtered subset of the configuration parameters received from the configuration data interface(s) 11 and 12.

For example, the filter control device 14 can select those configuration parameters for filtering in the parameter filter device 13 that have a maximum possible informative value regarding potential changes in the overall configuration of the avionics components 50. The informative value may be quantified, for instance, by means of the Hamming distance between the set of determined configuration parameters and the comparison set of reference values. For this purpose, the filter control device 14 can model in Karnaugh-Veitch diagrams or Quine-McCluskey tables possible combinations of configuration parameters for forming different subsets in order to find disjunctive normal forms for different subgroups of configuration parameters.

Under the constraint of a maximum number of configuration parameters to be taken into account, the selection setting for the parameter filter device 13 can be adjusted on the basis of the subset of configuration parameters that is found to be the most suitable for characterizing the overall status of the avionics network 100.

It can also be possible that the parameter comparison device 15 calculates for the currently filtered subset of determined configuration parameters a discriminatory power to discriminate between wanted and unwanted overall configuration statuses. This discriminatory power can be fed back to the filter control device 14 via a selection control signal from the parameter comparison device 15, in order to be able to adapt the selection settings empirically to the desired comparison quality.

For finer granularity and greater flexibility of the filtering, the parameter filter device 13 can have at least two sequentially arranged parameter filter stages 13a, 13b, 13n. The example in FIG. 1 shows three of such parameter filter stages, although it should be obvious that two, or more than three, parameter filter stages are also possible. A first of the at least two sequentially arranged parameter filter stages 13a then pre-filters the received configuration parameters. The pre-filtered configuration parameters are output to a subsequent, second of the at least two sequentially arranged parameter filter stages 13b, which accordingly post-filters the pre-filtered received configuration parameters for output of the filtered subset of the received configuration parameters.

The filter control device 14 can dynamically modify selection settings for the desired pre-filtering and post-filtering separately and independently of one another for each of the sequentially arranged parameter filter stages 13a, 13b, 13n. For example, the fineness of the post-filtering can be made dependent on the type of the configuration parameters in the pre-filter stage. In particular, the type of the pre-filtering can be made dependent on the number of avionics components 50 in the network that are identical in each case, for example.

Figure 3:
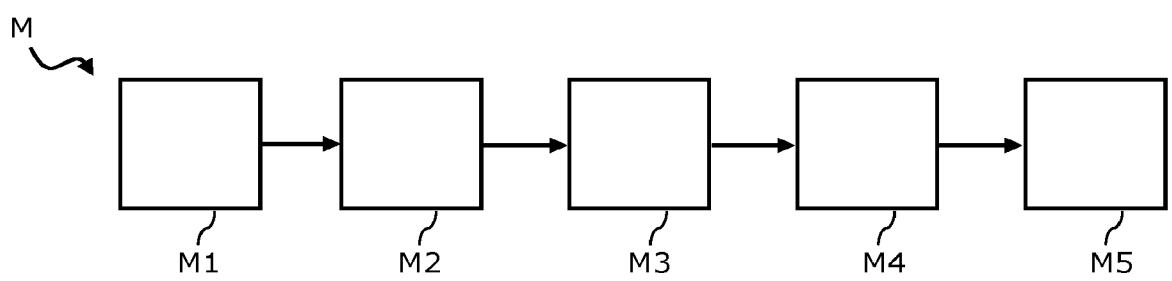
FIG. 3 is a flow diagram of a method for checking a configuration of an avionics network according to a further embodiment of the invention.

FIG. 3 shows a method M for checking a configuration of avionics components in an avionics network, in particular for use in an aircraft. The method M can be applied, for example, in an avionics network 100 as shown in FIG. 1. The method M can be implemented using the components of an avionics network 100 that were described in connection with FIG. 1. In addition, the method M can be used in an aircraft A described in connection with FIG. 2.

As a first step M1, the method M comprises determining a multiplicity of configuration parameters. The determined configuration parameters characterize an operating or configuration status of a multiplicity of avionics components 50. In a second step M2, the multiplicity of configuration parameters is transferred to a configuration data interface of a configuration monitoring device 10 in an avionics network 100.

In a step M4, a subset of the received configuration parameters is filtered out of the totality of the configuration parameters in a parameter filter device 13 of the configuration monitoring device 10. This can be done, for example, by the parameter filter device 13 having at least two sequentially arranged parameter filter stages 13a, 13b, 13n. The received configuration parameters can be pre-filtered in the first parameter filter stage 13a. The pre-filtered configuration parameters are then filtered further by means of post-filtering in a downstream second parameter filter stage, in order to be able to output the subset of the received configuration parameters at the final parameter filter stage.

The selection settings for the parameter filter device 13 or for the individual parameter filter stages 13a, 13b, 13n for selecting the configuration parameters contained in the filtered subset can optionally be changed in a step M3, for instance before filtering by the parameter filter device 13 is performed in step M4. This can be achieved by means of a filter control device 14, which can apply programmable control criteria as a reference for the change in the selection settings. These control criteria can be specified ab initio by a user, or alternatively can also be adjusted dynamically depending on a selection control signal from a parameter comparison device 15. In particular, the selection control signal from the parameter comparison device 15 can be implemented as a feedback signal from the parameter comparison device 15 according to the determined content of the output subset of the configuration parameters.

Finally, in a step M5, the parameter comparison device 15 compares the subset of received configuration parameters, which has been filtered by the parameter filter device 13, with a set of reference values for the configuration parameters that is stored in a reference-parameter memory 16. This comparison is used to check whether the configuration of the totality of the avionics components 50, from which the configuration parameters have been obtained, corresponds to an expected or desired configuration. The result of the comparison can accordingly be output at an interface of the parameter comparison device 15 to an external user apparatus 20, for instance a tablet, a display device or a personal electronic apparatus, for the attention of a user.

In the preceding detailed description, various features have been combined in one or more examples for the purpose of improving the rigor of the depiction. It should be obvious here, however, that the above description is purely illustrative in nature and has no limiting effect whatsoever. It serves to cover all the alternatives, modifications and equivalents of the various features and exemplary embodiments. Many other examples will be immediately and directly obvious to a person skilled in the art when considering the above description because of his technical knowledge.

The exemplary embodiments were chosen and described in order to best represent the principles underlying the invention and their potential uses in practice. Persons skilled in the art can hence optimally modify and use the invention and its various exemplary embodiments with regard to the intended use. In the claims and the description, the terms "including" and "having" are used as neutral terminology for the corresponding term "comprising". Moreover, use of the terms "one", "an", "a" does not necessarily rule out a plurality of features and components described in that way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An avionics network onboard an aircraft, comprising: a multiplicity of avionics components on the aircraft, wherein the avionics components comprise electronic avionic components; and a configuration monitoring device on the aircraft and connected to the multiplicity of avionics components in a wired or wireless manner, and which has: at least one configuration data interface, which is configured to receive a multiplicity of configuration parameters that characterize an operating status and an authorized configuration for each avionics component, and which are configured to allow a specific avionics component to be distinguished from all other avionics components; a parameter filter device, which is connected to the at least one configuration data interface, and is configured to filter a subset of the received configuration parameters; a reference-parameter memory, which is configured to store sets of reference values for configuration parameters; and a parameter comparison device, which is coupled to the reference-parameter memory and the parameter filter device, and is configured to compare the subset of the received configuration parameters, which has been filtered by the parameter filter device, with a set of reference values for the configuration parameters, which is stored in the reference-parameter memory, in order to determine a configuration of the multiplicity of avionics components and produce one or more fingerprints of a current configuration status, each fingerprint being unique to a respective composition of the avionics network, wherein the parameter comparison device certifies the composition by checking whether the determined configuration corresponds to the authorized configuration using the one or more fingerprints, wherein the parameter comparison device transmits the determined configuration to enable an action to be taken based on the determined configuration.

2. The avionics network as claimed in claim 1, additionally having a filter control device, which is coupled to the parameter filter device, and is configured to dynamically change selection settings for the parameter filter device for selecting the filtered subset of the received configuration parameters.

3. The avionics network as claimed in claim 2, wherein the filter control device is also coupled to the parameter comparison device and is configured to change the selection settings for the parameter filter device depending on a selection control signal from the parameter comparison device.

4. The avionics network as claimed in claim 2, wherein the parameter filter device has at least two sequentially arranged parameter filter stages, so that a first of the at least two sequentially arranged parameter filter stages pre-filters the received configuration parameters, and a second of the at least two sequentially arranged parameter filter stages post-filters the pre-filtered received configuration parameters for output of the filtered subset of the received configuration parameters.

5. The avionics network as claimed in claim 4, wherein the filter control device is coupled to each of the at least two sequentially arranged parameter filter stages and is configured to change, dynamically and independently of each other, selection settings for the at least two sequentially arranged parameter filter stages for pre-filtering and post-filtering.

6. The avionics network as claimed in claim 1, wherein one or more of the multiplicity of avionics components has a wireless communication module, which is configured to transfer configuration parameters wirelessly to a wireless configuration data interface of the configuration monitoring device.

7. The avionics network as claimed in claim 1, wherein the received configuration parameters comprise at least one of
    identification numbers of the avionics components,
    safety certificates of the avionics components,
    power consumption profiles of the avionics components,
    network traffic profiles of the avionics components,
    attenuation values of the cabling of the avionics components, or
    position in which the avionics components are installed in an aircraft.

8. The avionics network as claimed in claim 1, wherein the avionics components comprise at least one of
    cabin management apparatuses,
    aircraft cabin monuments,
    aircraft cabin lighting elements,
    aircraft-seat electronic apparatuses,
    cabin displays,
    galley appliances,
    cabin audio equipment, or
    passenger service units.

9. An aircraft having an avionics network as claimed in claim 1.

10. A method for checking a configuration of an avionics network onboard an aircraft, the method comprising: determining a multiplicity of configuration parameters that characterize an operating status and an authorized configuration of a multiplicity of avionics components on the aircraft and which are configured to allow a specific avionics component to be distinguished from all other avionics components, wherein the avionics components comprise electronic avionic components; transferring the multiplicity of configuration parameters to a configuration data interface of a configuration monitoring device on the aircraft; filtering a subset of the received configuration parameters in a parameter filter device of the configuration monitoring device; comparing, by means of a parameter comparison device of the configuration monitoring device, the subset of the received configuration parameters, which has been filtered by the parameter filter device, with a set of reference values for the configuration parameters, which is stored in a reference-parameter memory of the configuration monitoring device, in order to determine a configuration of the multiplicity of avionics components and produce one or more fingerprints of a current configuration status, each fingerprint being unique to a respective composition of the avionics network; certifying the composition by a checking means through use of the parameter comparison device utilizing the one or more fingerprints, whether the determined configuration corresponds to the authorized configuration: and transmitting the determined configuration to enable an action to be taken based on the determined configuration.

11. The method as claimed in claim 10, further comprising:
changing, by means of a filter control device of the configuration monitoring device, selection settings for the parameter filter device for selecting the configuration parameters contained in the filtered subset.

12. The method as claimed in claim 11, wherein the changing of the selection settings for the parameter filter device is performed depending on a selection control signal from the parameter comparison device.

13. The method as claimed in claim 11, wherein the parameter filter device has at least two sequentially arranged parameter filter stages, so that the filtering of the subset of the received configuration parameters comprises pre-filtering of the received configuration parameters in a first of the at least two sequentially arranged parameter filter stages, and post-filtering of the pre-filtered received configuration parameters in a second of the at least two sequentially arranged parameter filter stages for output of the filtered subset of the received configuration parameters.

14. The avionics network as claimed in claim 1, wherein the parameter comparison device transmits the determined configuration to the filter control device.

15. The avionics network as claimed in claim 1, further comprising an indicator apparatus coupled to the parameter comparison device, wherein the parameter comparison device transmits the determined configuration to the indicator apparatus.

16. The avionics network as claimed in claim 1, wherein the action to be taken includes processing a request from an external source to change one or more selection settings for the parameter filter device.

17. The avionics network as claimed in claim 1, wherein the action to be taken includes changing, dynamically via the parameter filter device, one or more selection settings.

* * * * *